Aug. 18, 1964  J. D. KELLER  3,144,846
AIR COOLED ANTI-WICKING TOOL FOR WIRE SOLDERING OPERATIONS
Filed Aug. 31, 1961

INVENTOR.
Joseph D. Keller,
BY
Richard W. Cifelli,
Attorneys

United States Patent Office 3,144,846
Patented Aug. 18, 1964

3,144,846
AIR COOLED ANTI-WICKING TOOL FOR
WIRE SOLDERING OPERATIONS
Joseph D. Keller, 1820 Winchester Drive,
Winter Park, Fla.
Filed Aug. 31, 1961, Ser. No. 135,335
5 Claims. (Cl. 113—98)

This invention relates to a tool for use in soldering operations as conducted for attaching electric wires, especially of the multi-strand type, in operative connection with apparatus or devices to be served thereby, whereby to prevent solder wicking of such wires.

In the soldering of multi-strand wires in connection with apparatus or devices to be served thereby, wicking of the wires occurs when the copper thereof reaches the temperature of the melting point of the applied solder, thus allowing the solder to flow, by capillary action, into the interstices of the multi-strand wire and under the wire insulation. Wire that has wicked stiffens adjacent to the wire lug or other connection point to which it is attached, thereby detracting from the reliability of the joint, and increasing risk of wire break at such point.

Various methods of providing heat sinks in the area of wire connections have been suggested and tried to prevent wicking, but such heat sinks have not absorbed sufficient heat to keep the wire temperature below the solder's melting point, and consequently undesirable wicking frequently occurred.

Having the above in view, it is an object of this invention to provide a novel tool, for use in wire soldering operations, which can be easily manipulated to hold or clamp the terminal end portion of a multi-strand wire at a point adjacent to the area of solder application, and to subject the wire rearward of said area to the effect of circulated cool air, thus preventing temperature rise of such rearward portions of the wire to that of the melting point of solder, and consequently preventing wicking and resultant stiffening of such wire portion to the detriment of desired flexibility; the tool being so designed as to allow the air to be in intimate contact with the wire strands, and to exhaust without chilling the solder joint.

The invention has for a further object to provide an easily manipulatable tool for air cooling effect, whereby such effect maintains the strength of the wire by preventing annealing thereof, and by preserving tensile strength of the wire by keeping the same below recrystallization temperature.

Figure 1:
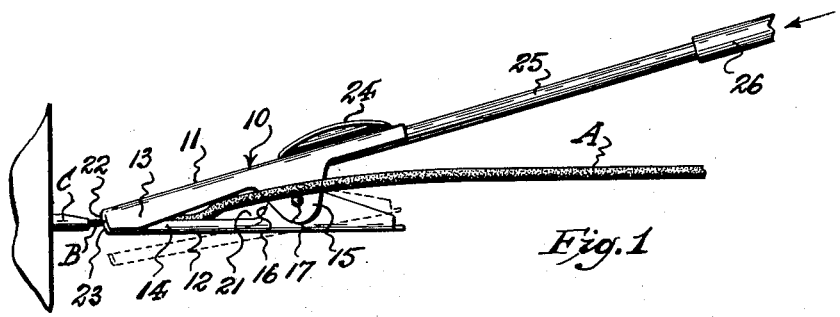
Figure 2:
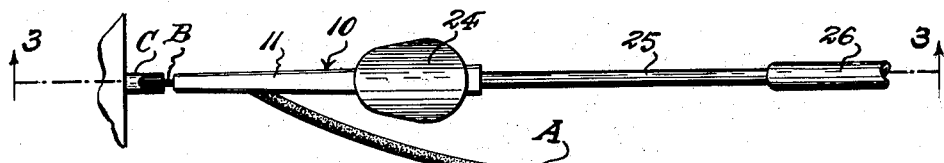
Figure 3:
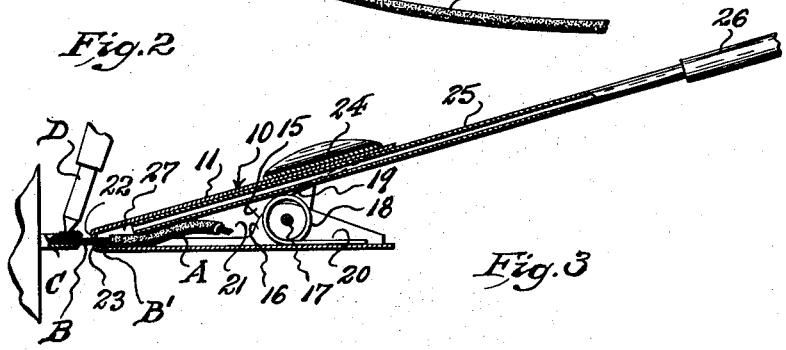
Figure 4:
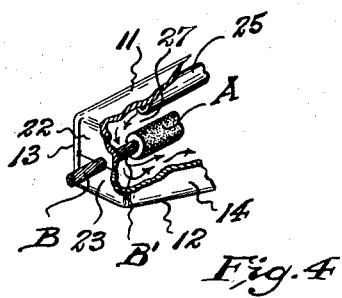

The above and other objects will be understood from a reading of the following description of an illustrative embodiment of this invention in connection with the accompanying drawings thereof, in which drawings:

FIG. 1 is a side elevational view of the anti-wicking tool of this invention as manipulated and applied in use; FIG. 2 is a top plan view of the same; FIG. 3 is a longitudinal sectional view of the same, taken on line 3—3 in FIG. 2; and FIG. 4 is an enlarged fragmentary perspective view, in part section, of the wire gripping jaws of the tool, and showing the cool air delivery and circulating means.

Like characters of reference are employed in the above described views, to indicate corresponding parts.

Referring to said drawings, the reference character 10 indicates the tool of this invention as a whole, the same comprising an upper jaw 11 and a lower jaw 12; said jaws normally converging at their forward ends. The upper jaw 11 is of inverted U-shape in cross-section, providing side walls 13, and the lower jaw 12 is also of U-shape in cross-section, providing side walls 14. The upper jaw 11 is provided, in extension from its side walls 13, and intermediate its ends, with downwardly projecting perforate pivoting ears 15, and the lower jaw 12 is provided, in extension from its side walls 14, with upwardly projecting perforate pivoting ears 16, which are lapped by said pivoting ears 15 of the upper jaw 11. A transverse pivot pin 17 extends through the pivoting ears 15 and 16, thus pivotally connecting said jaws 11 and 12 together for relative opening and closing of their forward end portions. A spring 18 is mounted around the pivot pin 17, one arm 19 of which yieldably thrusts upwardly against the rearward end portion of the upper jaw 11, and the other arm 20 of which yieldably thrusts downwardly against the rearward portion of the lower jaw 12, thus yieldably urging the forward ends of these jaws to mutually engaged, normal closed relation. When the forward end portions of the jaws 11 and 12 are thus closed together, the forward portions of their side walls are so disposed that those of the upper jaw 11 lap those of the lower jaw 12, but nevertheless leave a side opening 21 between said forward portions of these jaws, intermediate their forward normally closed ends and the above described pivotal connection by which said jaws are joined; this opening 21 permitting introduction of a wire to be operated upon between the forward end portions of the jaws, as will be hereinafter more particularly set forth.

At its forward end, the upper jaw is formed to provide a downwardly projecting transverse wire clamping member 22, which is preferably centrally notched at its gripping edge to embrace the bare portion of a wire to be operated upon. Likewise, the forward end of the lower jaw 12 is also provided with an upwardly projecting transverse wire clamping member 23, which is also preferably centrally notched at its gripping edge to embrace the bare portion of a wire to be operated upon.

Affixed upon the upper surface of the rear end portion of the upper jaw 11 is a thumb rest 24, by which said upper jaw can be conveniently manipulated in the use of the tool.

Affixed to the interior of the upper jaw 11, to extend thereinto toward, but in suitably rearwardly spaced relation to its wire gripping clamping member 22, is an air delivery tubular duct 25. The rearward portion of this tubular duct extends outwardly from the rear end portion of said upper jaw 11 a suitable distance, and is adapted to receive, in coupled attachment thereto, a flexible air delivery hose 26, which leads from a suitable source of cool air.

In the use of the tool, an insulated wire to be operated upon is bared at its free end portion from its insulation A, so as to expose a bare free end portion B, which is to be soldered to receiving terminals or connections C of an apparatus or device desired to be served by said wire. The forward end portions of the jaws 11 and 12, by manipulation, being opened, the wire so prepared is inserted sidewise through the side opening 21, and its bared terminal B is passed between the opened clamping members 22 and 23 of said jaws 11 and 12, whereupon said jaws are allowed to close, so that said bare terminal end portion B is gripped by the notched gripping edges of the closed clamping members 22 and 23 of said jaws. As the wire is thus engaged, the forward part of the bare terminal end portion B projects outwardly from the closed clamping members, leaving a rearward part B' thereof within the interior chamber 27 provided by the closed together forward end portions of said jaws 11 and 12. The closed jaws 11 and 12 grip the bare terminal end portion B of the wire and permit it to be engaged with a terminal or connection C of apparatus or a device to which it is desired to be attached by soldering thereto.

This having been done, the wire is ready to undergo soldering to said terminal or connection C. Preparatory to such soldering operation, cool air is delivered, from a source, through air duct 25, and is caused to flow through the chamber 27 provided by the closed end portions of the jaws 11 and 12, and thus around and in contact with the rearward part B' of the bared wire B, behind the gripping clamping members 22 and 23. By reason of such bathing of this rearward part B' of the bared wire B by the circulated cool air, the temperature of said wire part B' is kept below that of the melting point of solder, and consequently no wicking of this part B' of the wire can occur, and objectionable stiffening penetration of solder thereinto and under its insulation A can occur, so that desired flexibility of these wire parts is assured. Under these circumstances, solder can be applied by soldering iron D (see FIG. 3) to the free wire end portion and the terminal or connection C, whereby to make the desired connection for electrical current service by the wire to the apparatus or device to be served thereby.

Having now described this invention, what is claimed is:

1. An anti-wicking tool for wire soldering operations comprising a pair of pivotally connected jaws, spring means to yieldably urge the forward portions of the jaws in mutually engaged closed relation, each jaw having at its forward free end a transverse wire clamping member adapted to grip a bared end portion of an electric wire engaged therebetween, and a tubular air delivery duct unitary with one of said jaws through which cool air can be discharged in contact with that portion of the gripped bared wire disposed behind said gripping clamping members, whereby to keep the latter portion of the wire at a temperature below the melting point of solder during a soldering operation.

2. An anti-wicking tool for wire soldering operations according to claim 1, wherein said jaws have converging forward portions and divergent rearward portions, and the rearward portion of one of said jaws is provided with a thumb rest affixed thereto to facilitate manipulation of the jaws in use.

3. An anti-wicking tool for wire soldering operations comprising a pair of pivotally connected jaws having convergent forward end portions and divergent rearward end portions, said jaws having at the free ends of their forward end portions opposed transverse wire clamping members adapted to grip a bared end portion of an electric wire passed therebetween, spring means to yieldably urge the forward end portions of said jaws and their wire clamping members in mutually closed relation, whereby to cause said clamping members to close upon and grip the bared portion of the wire passed therebetween, said jaws having lapped side walls at their converging forward end portions, whereby to provide an interior chamber intermediate said jaws and behind their clamping members to enclose the bared portion of the gripped wire which extends rearwardly from the latter, and a tubular air delivery duct unitary with one of said jaws through which cool air can be discharged into said enclosing chamber for contact with that portion of the gripped bared end portion of the wire behind said clamping members, whereby to keep the latter portion of the wire at a temperature below the melting point of solder during a soldering operation.

4. An anti-wicking tool for wire soldering operations according to claim 3, wherein the convergent forward end portions of the jaws and their lapping sidewalls rearwardly of said chamber are divergently spaced apart to provide a side entrance opening leading into said chamber for introduction of the wire to be operated upon into the tool for engagement of the bared end portion thereof by the clamping members of said tool jaws.

5. An anti-wicking tool for wire soldering operations according to claim 3, wherein the divergent rear end portion of one jaw is provided with a thumb rest affixed thereto to facilitate manipulation of the tool jaws in use.

References Cited in the file of this patent

UNITED STATES PATENTS 469,389     Kendall _____ Feb. 23, 1892

FOREIGN PATENTS 448,282     Canada _____ May 4, 1948

OTHER REFERENCES

Popular Mechanics Shop Notes, volume 33, 1937 (page 141, Avoiding Burned Insulation When Soldering Wire Splices, relied on).

Electronic Design, April 1, 1959 (page 103, Wetfelt Sinks Heat, relied on).